US008812011B2

(12) United States Patent
Hassan et al.

(10) Patent No.: US 8,812,011 B2
(45) Date of Patent: Aug. 19, 2014

(54) DISTRIBUTED DATABASE ACCESS FOR SPECTRUM ACCESS

(75) Inventors: Amer A. Hassan, Kirkland, WA (US); Andrew T. Baron, Redmond, WA (US); Billy R. Anders, Jr., Bothell, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 12/703,490

(22) Filed: Feb. 10, 2010

(65) Prior Publication Data

US 2011/0195667 A1 Aug. 11, 2011

(51) Int. Cl.
*H04B 5/00* (2006.01)
(52) U.S. Cl.
USPC ........ 455/454; 455/41.1; 455/41.2; 455/41.3; 455/447; 455/448
(58) Field of Classification Search
USPC ............... 455/454, 41.1, 41.2, 41.3, 447, 448
See application file for complete search history.

(56) References Cited

U.S. PATENT DOCUMENTS

| | | | |
|---|---|---|---|
| 6,738,599 B2 * | 5/2004 | Black et al. | 455/62 |
| 7,111,006 B2 | 9/2006 | Vange | |
| 7,813,373 B2 * | 10/2010 | Joshi et al. | 370/458 |
| 7,881,726 B2 * | 2/2011 | Gurney et al. | 455/454 |
| 8,140,085 B2 * | 3/2012 | Chaudhri et al. | 455/450 |
| 8,254,844 B2 * | 8/2012 | Kuffner et al. | 455/63.4 |
| 2007/0253394 A1 * | 11/2007 | Horiguchi et al. | 370/338 |
| 2009/0131014 A1 | 5/2009 | Mashinsky | |
| 2009/0221283 A1 * | 9/2009 | Soliman | 455/426.1 |
| 2009/0245119 A1 | 10/2009 | Kuffner | |
| 2009/0247205 A1 | 10/2009 | Sennett | |
| 2009/0275294 A1 | 11/2009 | Callaway | |
| 2010/0112946 A1 * | 5/2010 | Urushiyama | 455/41.2 |
| 2011/0122855 A1 * | 5/2011 | Henry | 370/338 |
| 2011/0143761 A1 * | 6/2011 | Uusitalo et al. | 455/450 |
| 2011/0183632 A1 * | 7/2011 | Suumaki et al. | 455/77 |
| 2011/0275322 A1 * | 11/2011 | Sawai et al. | 455/41.2 |

OTHER PUBLICATIONS

Claudio et al., "Distributed Spectrum Sensing for Cognitive Radio Systems" published 2007, http://ita.ucsd.edu/workshop/07/files/paper/paper_424.pdf.
Introducing the White Spaces Database Group, Feb. 4, 2009, http://googlepublicpolicy.blogspot.com/2009/02/introducing-white-spaces-database-group.html.
Lazos et at. "Spectrum Opportunity-Based Control Channel Assignment in Cognitive Radio Networks" retrieved Dec. 3, 2009, http://www.ece.arizona.edu/~llazos/papers/LAZOS_SECON09.pdf.
First Office Action, Patent App. No. 2011216135, mailed Feb. 10, 2014, Australia.

* cited by examiner

*Primary Examiner* — Wen Huang
(74) *Attorney, Agent, or Firm* — John Jardine; Andrew Sanders; Micky Minhas

(57) ABSTRACT

A bootstrapping technique for wirelessly obtaining white space data that may be used to identify an available white space channel for connecting to a service. Portable wireless devices may collaborate to provide white space data to a device requesting such data. A requesting device transmits a request for the white space data using, for example, an unlicensed band. A device receiving the request may transmit a copy of the data to the requesting device. The transmitted copy may be obtained by the receiving device from a local data store or may be provided from a database server to which the receiving device is connected. In the later case the receiving device acts as a proxy between the database server and the requesting device. Once the white space data is received by the requesting device it may be used to select a channel for communication in the white space.

19 Claims, 8 Drawing Sheets

DISTRIBUTED DATABASE ACCESS FOR SPECTRUM ACCESS

BACKGROUND

Wireless transmissions are used for wireless networking among computing devices as well as in other settings, such as to support broadcast of radio and television content. To avoid interference between the signals of different users, different portions of the frequency spectrum available for wireless communication are allocated to different uses.

The frequency spectrum has been divided administratively into two primary sectors: the licensed spectrum and the unlicensed spectrum. The licensed spectrum consists of frequencies that are available for license to organizations, such as commercial broadcasters, for exclusive use by those organizations. For example, a portion of the spectrum (also known as a "frequency band," "band," or "channel") may be licensed to a cellular communications company for use in communicating information representing voice and data calls placed by its subscribers, or licensed to a media broadcaster to transmit signals carrying audio and video data representing television content. The unlicensed spectrum, on the other hand, has been allocated for free use by the public—though, typically, use of the unlicensed spectrum requires operating in accordance with some regulations, such as maximum power output regulations, that are designed to minimize interference between users.

In any geographic location, the full licensed spectrum may not be assigned to users. Rather, there may be unassigned bands, sometimes called "white space." In some regions, there are more channels available than there are organizations interested in licensing a channel, leaving some channels as white space. Also, when frequency bands of the licensed spectrum are assigned to organizations, typically they are not assigned consecutively; instead, there may be white space between the assigned bands to prevent two organizations from interfering with one another. In a simplified example, if a section of licensed spectrum between 300 MHz and 350 MHz is to be divided between two organizations, the 300-320 MHz band may be assigned to the first organization and the 330-350 MHz band granted to the second organization, leaving the 320-330 MHz band as "white space." Recently, it has been proposed that white space may be used by unlicensed transmitters as if the unused portions were a part of the unlicensed spectrum. Such use of the white space, however, is predicated on using techniques that prevent unlicensed users from interfering with licensed users.

In November of 2008 the Federal Communications Commission (FCC) issued rules stating that devices could be approved for unlicensed white space use. According to a proposed implementation, devices of unlicensed users can avoid interference with licensed users of the licensed spectrum either by monitoring a band to determine that it is not in use or by consulting a database of unassigned bands applicable to the geographic location of the unlicensed user.

SUMMARY

The inventors have recognized and appreciated that though portable wireless devices generally have receivers, which theoretically could be used to detect unused channels in a licensed spectrum, those receivers generally lack the sensitivity to distinguish between licensed communications and noise with an accuracy that meets FCC requirements. However, white space data, identifying available channels in the vicinity of a portable device, is frequently not available to the portable wireless device. Lack of ready access to a white space data has hampered adoption of unlicensed use of white space.

Access to white space data is improved by configuring portable wireless devices to respond to requests for white space data from other nearby portable wireless devices. Accordingly, a portable wireless device seeking to identify a channel of the licensed spectrum available for unlicensed use may send a request to one or more nearby devices. Information received from one or more nearby devices in response to such a request may allow the device requesting the white space data to select an unused channel or to otherwise be configured with transmission and reception parameters to communicate using the identified unlicensed white space.

In some embodiments, other wireless devices near a requesting device may receive the request and respond by transmitting a locally stored copy of white space data to the first device. If the requesting device receives multiple responses, the requesting device may synthesize the received copies to select a channel for unlicensed use in the white space. Optionally, the receiving device may use the selected channel to form a connection to a trusted source of white space data. Over this connection, the requesting device may download a trusted copy of a white space data. White space data from the trusted source may then be used to select an available channel, which may be the same as the initially selected channel, for further communication within the white space.

In other embodiments, another device in the vicinity of the requesting device may respond, indicating that it is available to act as a proxy through which the requesting device can establish a connection to a trusted source of the white space data. The requesting device may then download the white space data from the trusted source using a connection through the other device acting as a proxy. That connection may be secured, between the requesting device and the trusted source, which may allow the requesting device to rely in the data without making a further connection to the trusted source.

Regardless of how the requesting device obtains white space data from a trusted source, once it does, it may optionally share the white space data from the trusted source with other nearby devices, such as by broadcasting the data obtained from the trusted source or sending updates to those devices that initially responded to the request for white space data.

Aspects of such a technique for making white space data available to portable wireless devices may be implemented in a portable wireless device, that requests white space data, responds to requests for white space data or both. Other aspects may be implemented as a system, comprising at least one device that requests white space data and at least one device that responds to such a request. Aspects may also be implemented as a method of operating a portable wireless devices to request or respond to a request for white space data. Further, aspects may be implemented as computer-executable instructions, recorded in at least one computer readable medium, that, when executed by a processor associated with a portable wireless device, performs such a method.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented

DETAILED DESCRIPTION

The inventors have recognized and appreciated that functionality of portable wireless devices may be expanded by enabling the wireless device to obtain a copy of white space data, identifying available channels in a licensed spectrum, through interaction with nearby other portable wireless devices. With the white space data, a portable wireless device can select a channel in a licensed spectrum in a way that complies with Federal Communications Commission (FCC) requirements for unlicensed use of white space. As a result, the device may have greater options for communication, increasing the likelihood that a user of the portable device will experience fast and reliable communications.

Interactions with other portable wireless devices may solve a bootstrapping problem that may tend to limit use of a white space for communication. Up-to-date and reliable white space data, which is used to identify parameters, such as transmission and/or reception parameters, for wireless white space communication, can be obtained without first establishing a connection over a white space channel to a source of white space data.

Figure 1:
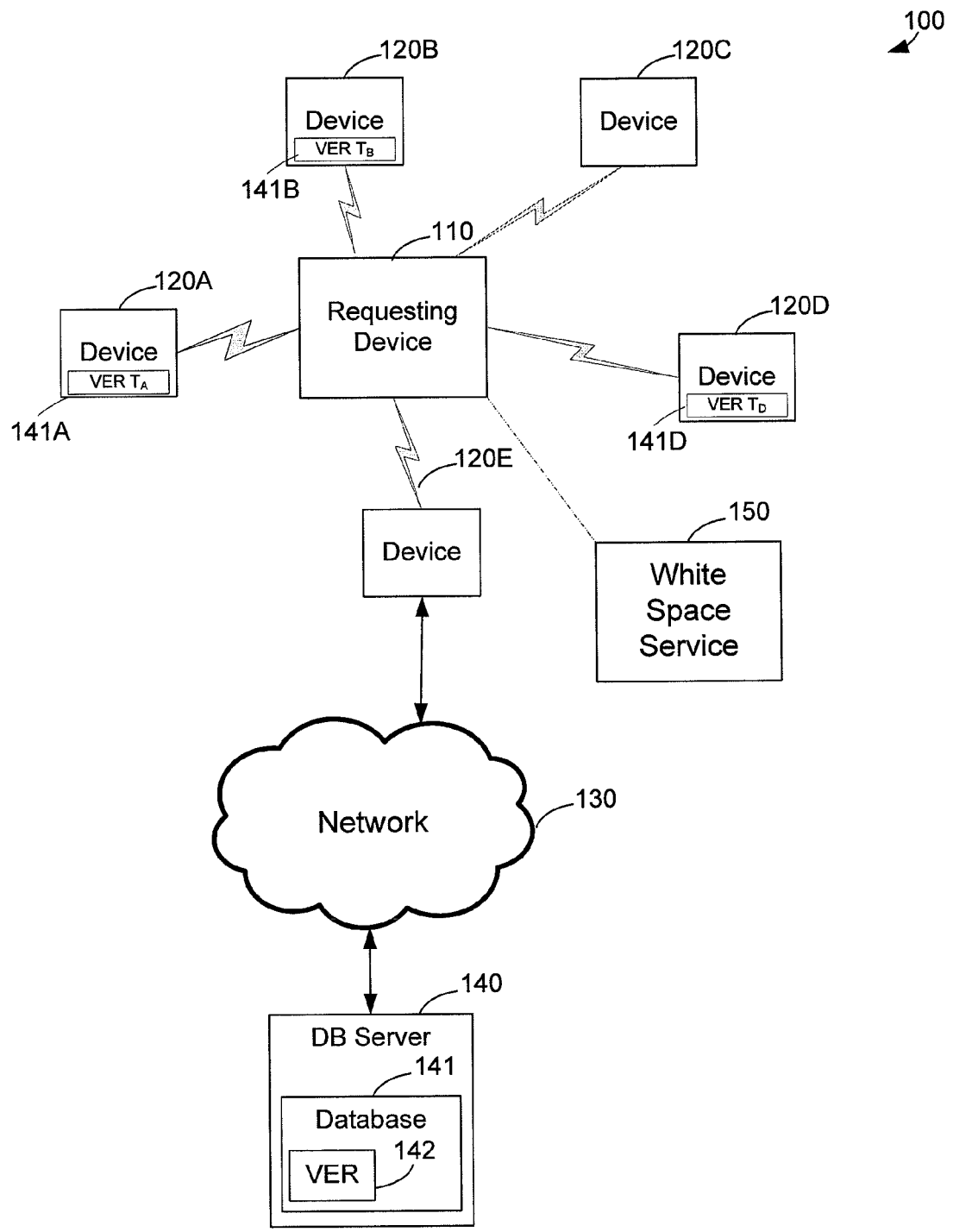
FIG. 1 is a block diagram of an operating environment according to some embodiments of the invention.

FIG. 1 is a block diagram of an operating environment 100 according to some embodiments. Operating environment 100 may be any location, such as a public place or an office within an enterprise in which multiple devices, illustrated as device devices 120A . . . 120E are close enough to a device 110 that device 110 can communicate wirelessly with each of the devices 120A . . . 120E. In the embodiment illustrated, each of devices 110 and 120A . . . 120E may be regarded as a wireless client, as opposed to an access point of other infrastructure component of a wireless network. Accordingly, these devices may be portable wireless devices, such the number of devices within environment 100 may change as devices are moved in and out of the environment. Moreover, if devices move in and out of environments, data they store about white space channels available in one location may become out-of date. According to some embodiments of the invention, the client devices collaborate so that any device in the environment may have access to white space data.

In the example illustrated in FIG. 1, device 110 requests white space data from other devices in its vicinity, which in this case are devices 120A . . . 120E. While five such devices 120A . . . 120E are shown in FIG. 1, any suitable number of receiving devices 120A . . . 120E may be present in operating environment 100.

Requesting device 100 may request white space data in order to communicate wirelessly in a white space channel which, in accordance with FCC regulations, may be selected from a database of white space channels identifying unused channels in the licensed spectrum within environment 100.

The reason that device 110 is initiating communication in the white space is not critical to the invention. For example, device 110 may initiate a request for white space data in response to user input indicating a desire to connect to a service, illustrated as white space service 150, to which a connection may be established using a channel in the white space. Alternatively, device 110 may seek to communicate in the white space in response to a determination that communication at a desired data rate cannot be accommodated within the unlicensed spectrum. It is known, for example, that attenuation of radio signals is a function of the frequency of signals. Portions of the unlicensed spectrum above 2 GHz, such as about 2.4 GHz, are widely used for unlicensed communication between computers. In contrast, white space in a licensed spectrum used for digital TV transmission may be on the order of less than 1 GHz, such as around 700 MHz. Transmission in the unlicensed spectrum may be attenuated by approximately a factor of 10 more than if the licensed spectrum were used, limiting the range and/or data rate of communications in the unlicensed spectrum.

Regardless of the reason that requesting device 110 initiates communication in white space, requesting device 110 may obtain white space data if it does not already store a copy of suitable white space data identifying available channels. In the example of FIG. 1, requesting device 110 is either not configured in advance with a white space database identifying available white space channels or may have a database that may not be appropriate for use. For example, requesting device 110 may have a copy of a white space database that is out of date or not appropriate for the current location of requesting device 110.

Regardless of the reasons for communicating in the white space or for obtaining white space data, device 110 may attempt to obtain the white space data by communicating with other wireless devices in the environment 100. Accordingly, device 110 may transmit a request to one or more other wireless devices. A device receiving such a request may respond in ways that facilitate device 110 receiving white space data. In this example, devices 120A . . . 120E act as receiving devices receiving a request from device 110 for white space data.

In the example illustrated, database server 140 may serve as a trusted source of a white space database 141. Database server 140, for example, may be a server hosted by a governmental agency, standards bureau or other quasi governmental agency that is certified as having accurate and up to date information concerning white space allocation, at least in a particular geographic location. However, in the scenario depicted in FIG. 1, requesting device 110 does not have direct communication with server 140. Though requesting device 110 may be able to communicate with server 140 if it could select an appropriate white space channel, requesting device 110 may be unable to directly connect to server 140 before it selects a white space channel. Yet, requesting device would use data stored in server 140 to select such a channel, creating a bootstrapping problem.

To overcome this bootstrapping problem, requesting device 110 may request that one or more receiving devices 120A . . . 120E participate in providing white space data to requesting device 110. Receiving devices 120A . . . 120E may participate in providing white space data in one or more ways. For example, one or more receiving devices may provide a copy of white space data they store. As another example of a way in which a receiving device may participate in providing white space data, a receiving device that has an established network connection to a server or other computer location from which white space data can be obtained may act as a proxy to allow requesting device 110 to communicate, using the network connection already established, with the server to obtain the data.

In an embodiment in which receiving devices 120A . . . 120E respond to a request by providing a copy, each receiving device may have a local copy of white space database 141. In response to a request for white space data, which may be broadcast throughout environment 100, receiving devices 120A . . . 120E one or more of these devices may transmit their copy of the white space data. In the example of FIG. 1, receiving devices 120A, 120B and 120D each have a copy 141A, 141B and 141D, respectively. In this scenario, receiving devices 120A, 120B and 120D each may respond to the request.

If requesting device 110 receives multiple copies of white space data, it may employ a mechanism to synthesize the data. In some instances, requesting device 110 may use time information associated with each copy of the data to select a most recent copy. This time information may take any suitable form, such as version information, which can indicate a time at which a trusted source created or last updated a white space database from which the data was copied. As another example, the time information can be in the form of a time stamp, indicating when a database was created or when a receiving device received a copy of the data.

Regardless of the specific format in which time information is recorded, the time information may be communicated to the requesting device 110. Requesting device 110 may use the time information to identify the most up-to-date version it receives to select a white space channel. Though, identifying white space data to select a channel in this way may be conditioned on criteria, such the most up-to-date version having a time value indicating a time within a threshold amount of time prior to the time in which it is to be used. As one specific example, the most up-to-date version may only be used if it has a time stamp indicating that it was copied from a trusted source less than three days before the time of use. Another criteria may be that the most up-to-date version is more up to date than the next most recent version by at least some threshold amount of time. For example, the most up-to-date version has a time stamp at least one day later than the next most recent version.

In some scenarios, requesting device 110 may synthesize the data received from multiple receiving devices and select a channel based on synthesized data. In some embodiments, requesting device 110 may always synthesize data when multiple copies are received. In other embodiments, requesting device 110 may be triggered to synthesize data when none of the received copies of the white space data meet criteria for use as a most up-to-date copy.

Regardless of how the responses are used to select a channel from the white space data, the selected channel may be used by requesting device 110 to establish white space communication. However, in some embodiments, the selected channel may be used as a temporary channel assignment. The suitability of the temporary channel assignment may be validated. If validated, that channel assignment may be used for further communication. If not, another channel may be selected.

As an example, requesting device may use the initial channel assignment to form a connection with server 140, which is a trusted source of the white space data. Requesting device 110 may then download a trusted copy of the white space data from server 140 to validate the initial channel assignment. In some embodiments, requesting device 110 may download a full white space data for a geographic region. That database may be used to select a channel, which may be the same or different than the initial channel selection, for white space communication.

As an alternative or additional way that receiving devices may participate in requesting device 110 obtaining white space data, some of receiving devices 120A . . . 120E may facilitate an indirect connection between requesting device 110 and server 140. For example, device 120E may have a connection to network 130 from which database server 140 is accessible. Receiving device 120E may then act as a proxy, allowing requesting device 110 to form a connection to server 140 through a connection that receiving device 120E may form with server 140.

The manner in which device 120E is connected to server 140 is not critical to the invention. Network 130 may be the Internet or any other suitable network from which database server 140 is accessible. In some embodiments, device 120E may connect to network 130 using a white space channel.

Regardless of how the connection is established between device 120E and server 140, once the connection is established, device 120E may simply relay packets between requesting device 110 and server 140. In this way, requesting device 110 can use any suitable protocol to communicate with server 140. In some embodiments, the protocol for communication may involve creating a security association, which may allow requesting device to authenticate server 140 as a trusted source of white space data and/or ensure that white space data from server 140 is not altered, unintentionally or maliciously, by receiving device 120E or other intermediary device.

In embodiments in which requesting device 110 receives data using another portable electronic device as a proxy to connect to a server, requesting device may validate that a channel selected based on this data is available for use. However, in embodiments in which a secure connection is formed through the proxy, the validation step may be omitted.

Regardless of how the white space data is obtained, requesting device 110 may use it to select a channel and establish communication using a frequencies within one or more white space channels, indicated by the data to be available. The nature of those communications is not critical to the invention. As an example, communication with a white space service may be initiated. White space service 150 may be any suitable type of service accessible over a white space channel. For example, service 150 may provide access to a network such as network 130. In some embodiments, service 150 provides Internet access over a white space channel.

In some embodiments, requesting device 110 and receiving devices 120A . . . 120E may be portable electronic devices. Such devices are susceptible of having out-of-date white space data. Because such devices may move from location to location, white space data they store may become out of date simply due to the passage of time while the device is not connected to a network over which the device can download updated copies of the white space data. Copies of data may also become out of date as the portable devices move from one location to another. However, it should be appreciated that techniques described herein for obtaining white space data may be employed with any computing device with a wireless network interface adapted for communication in a licensed spectrum.

Figure 2:
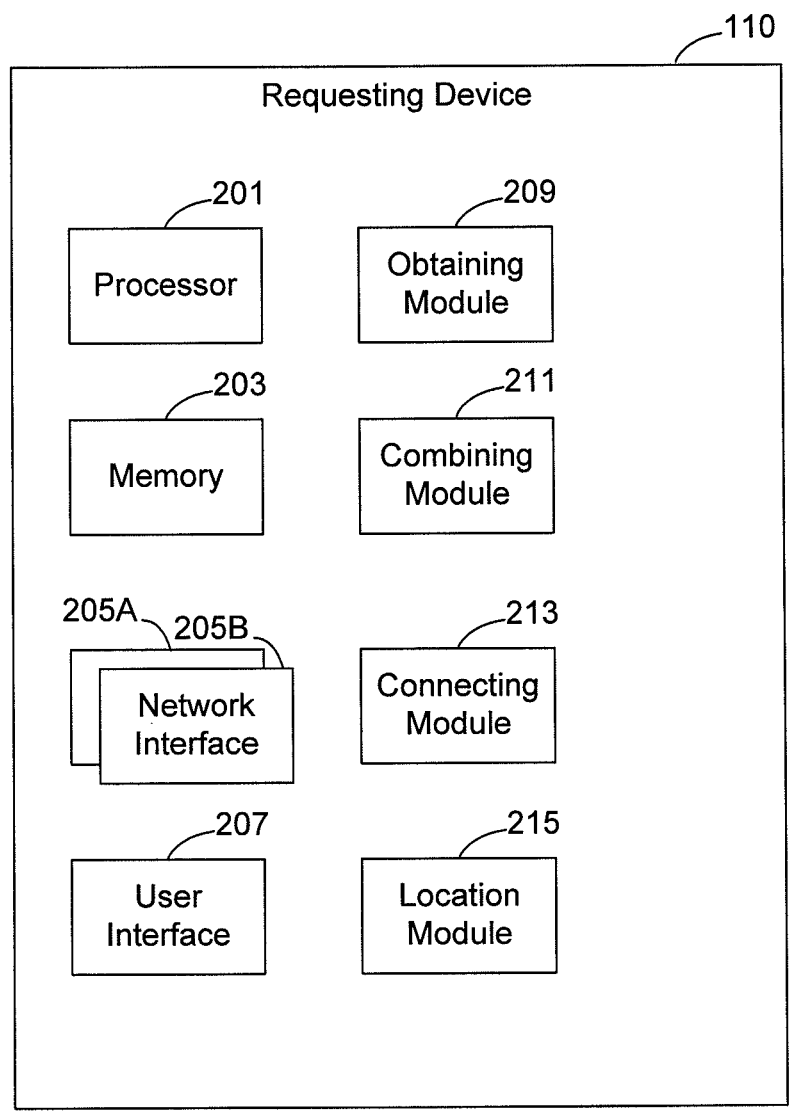
FIG. 2 is a block diagram of a portable wireless device configured to request white space data according to some embodiments of the invention.

FIG. 2 is a block diagram of requesting device 110 according to some embodiments. As discussed above, requesting device 110 is a device seeking a copy of the white space data that may be used at the device's location. Once the copy is obtained by requesting device 110, the device may be configured to access a white space service.

Requesting device 110 may be implemented with any suitable device capable of wireless communication. For example and not limitation, requesting device 110 may be implemented as a personal digital assistant (PDA), laptop, mobile phone, smartphone, or any other suitable wireless communications device. In some embodiments, requesting device 110 may include processor 201, memory 203, wireless network interfaces 205A and 205B, user interface 207, obtaining module 209, combining module 211, connecting module 213, and location module 215.

Processor 201 may be any one or more processors as are known in the art or any other suitable processing device. For example and not limitation, processor 201 may include any of a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device. Processor 201 may execute computer executable instructions to control the components of requesting device 110 to obtain white space data and to identify and communicate in a white space channel using techniques as described herein.

Memory 203 may be integrated into processor 201 and/or may include "off-chip" memory that may be accessible to processor 201, for example, via a memory bus (not shown). Memory 203 may store software modules that when executed by processor 201 perform a desired function. For example, in some embodiments obtaining module 209, combining module 211, connecting module 213, and location module 215 may be software modules stored in memory 203. Though, modules 209-215 may be implemented in any suitable way. Memory 203 may be any suitable type of computer-readable storage medium such as, for example and not limitation, RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, or other semiconductor devices, or other tangible computer storage medium.

Requesting device 110 may also include one or more network interfaces for wired and/or wireless communication. Here requesting device 110 has network interfaces 205A and 205B. Network interfaces 205A-205B may be any suitable combination of hardware and software configured to communicate over a network. For example, each network interface 205A and 205B may be implemented as a network interface driver and a network interface card (NIC) including a wireless transmitter and receiver, or equivalently a transceiver. The driver may be configured to receive instructions from other components of requesting device 110 to perform operations with the NIC. The NIC may be configured to generate and receive signals for communication over a wireless network or directly with other wireless devices.

Requesting device 110 may include one or more wireless network interfaces over which a request for white space data may be transmitted and one or more responses may be received. Requesting device 110 may also include one or more wireless network interfaces that can be configured for white space communication once a channel is selected. The wireless network interfaces through which white space data is obtained and through which white space communication occurs may be the same or different interfaces.

In some embodiments, requesting device 110 may send requests for white space data and receive responses using the unlicensed spectrum. The unlicensed spectrum may use a higher range of frequencies than the licensed spectrum. Accordingly, separate wireless network interfaces may be employed to obtain white space data and to perform white space communications.

As a specific example, requesting device 110 may use frequencies conventionally used for BLUETOOTH® communications or IEEE 802.11 communications to transmit a request for white space data and to receive responses. In contrast, requesting device 110 may use frequencies in the spectrum allocated for digital TV transmissions for white space communication. Separate network interfaces may be present to support communications in these different frequency ranges. Accordingly, requesting device 110 is illustrated to contain two wireless network interfaces 205A and 205B.

In some embodiments, a NIC may include multiple transceivers to accommodate communication over a wide range of spectrum. Wireless network interfaces 205A and 205B, for example, may be implemented using a software defined radio that, using such a wideband NIC, can be programmed appropriately for communicating at frequencies used to obtain white space data and for white space communication.

In some embodiments, white space data may be obtained based on the present location of the requesting device. Accordingly, requesting device 110 may include a component that determines its location, such as location module 215. Location module 215 may be implemented using any suitable combination of hardware and software. It should be appreciated that the location of device 110 need only be accurate enough for the purpose of identifying suitable white space data. In some circumstance, different white space databases are defined for different geographic regions. Typical broadcasts of a licensed spectrum service cover tens or hundreds of square miles. Accordingly, the ability to determine the requesting device's location to within a few miles may be sufficiently accurate. In many cases being able to identify a city, metropolitan area, or even a country in which requesting device 100 is located may be sufficient for the purpose of identifying an appropriate white space database.

Location module 215 may determine the location of requesting device 110 in any suitable way. Several examples of location module 215 are now provided. These examples are illustrative and not intended to be exhaustive because the current location may be determined in any suitable way.

In some embodiments, location module 215 may utilize a global navigation satellite service (GNSS) to determine the current location of computing device 100 from navigational satellites. Examples of GNSSs include the United States' Global Positioning Service (GPS), the European Union's Galileo positioning system (scheduled for 1012), the Russian's GLONASS system, and China's Compass system. Though, any suitable GNSS may be supported.

In some embodiments, location module 215 may analyze wireless beacons to determine the current location of requesting device 100. Such beacons may be received through wireless network interface 205A or 205B or obtained in any other suitable way. How the beacon represents information that may be used to determine the current location may depends on the source of the beacon signal. For example, public land mobile networks (PLMN) each have a unique identifier known as Location Area Identity (LAI). The LAI includes a mobile country code (MCC) which is standardized. As another example, IEEE 802.11d beacon signals include a country code. Because compliance with 802.11d is voluntary and the country code is set by users, the beacon signal analyzing service may be configured to test for agreement between multiple beacon signals from several networks before relying on the country code indicated by IEEE 802.11d beacons.

In some embodiments, location module 215 may use signals from cellular communications towers to determine the current location of requesting device 110. For example, the principle of triangulation may be used to identify the current location of requesting device 110.

In some embodiments, location module 215 may prompt the user to designate the current location. The user entry module may prompt the user to provide the current location in any suitable way. For example, by displaying a map through user interface 207 and having the user indicate her location on the map using a pointing device. In some embodiments, successive designations may be used by zooming the map in on an area near the previous designation. In some embodiments, the user simply enters, for example, the name of a city or country which is the current location. Though, the user may be prompted in any suitable way.

Obtaining module 209, combining module 211, and connecting module 213 are modules that may be used to obtain the white space data, identify an available white space channel, and configure requesting device 110 for white space communication, such as by communicating with a white space service, respectively. These modules may be implemented in any suitable combination of hardware and software. Module 209, 211 and 213 may be used to implement method 400 and sub-method 450, which are subsequently discussed with reference to FIGS. 4A-B.

Figure 3:
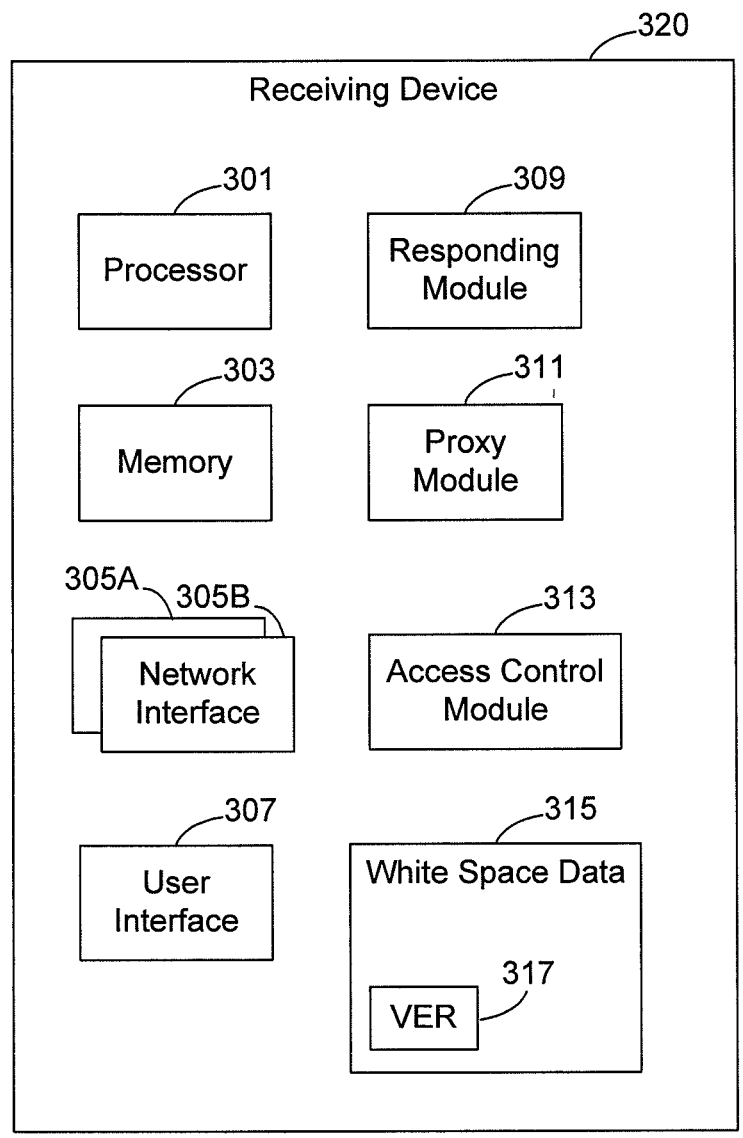
FIG. 3 is a block diagram of a portable wireless device configured to respond to a request for white space data according to some embodiments of the invention.

FIG. 3 is a block diagram of a receiving device 320 according to some embodiments. Receiving device 320 is representative of one of the receiving devices 120A ... 120E. Though, it should be appreciated that receiving devices 120A ... 120E may have the same or different configurations.

Receiving device 320 may have a processor 301, memory 303, wireless network interface 305, and user interface 307. In some embodiments, a portable computing devices may sometimes act as a requesting device and may sometimes act as a receiving device. Accordingly, the components illustrated in FIG. 3 may have similar form and function as the corresponding components discussed above with reference to FIG. 2.

Though, to act as receiving device, receiving device 320 may include components that were not discussed above in connection with FIG. 2. Requesting device 320 may also have white space data 315 stored in a computer storage medium. The white space data stored on each device that can act as a receiving device or a requesting device may be a full white space database, indicating all known channel assignments in a licensed spectrum, in a format copied from an authoritative source for white space data, such as server 140 (FIG. 1).

However, in some embodiments, white space data 315 may be a subset of available data. For example, server 140 may store channel assignments for multiple geographic locations and a receiving device 320 may store only the channel assignments applicable to its current location. Further, to identify a channel for white space communication, it is not a requirement that all channel assignments be known. Accordingly, white space data 315 may indicate available channels rather than channel assignments. In scenarios in which there are multiple available channels, white space data 315 may indicate only a subset of available channels.

Stored in connection with white space data may be time information from which up-to-date data copies can be identified. In the example of FIG. 3, that time information is in the form of a database version identifier. Version identifier 317 may indicate a version of a white space database from which white space data 315 was copied. For example, version identifier 317 may indicate a version number and/or a time at which white space data 315 was downloaded from an authoritative white space database source, such as database server 140 (FIG. 1).

Though not expressly illustrated, other identifying information may be associated with white space data 315. For example, white space data 315 may contain an indicator of a geographic region for which the white space data is valid. Also, it should be appreciated that FIG. 3 illustrates a single copy of white space data, representing the most up-to-date white space data stored on the device. However, in some embodiments, receiving device 320 may have other copies of the white space data corresponding to different geographic regions (not shown).

Receiving device 320 may include components that enable the receiving device to receive and respond to requests for white space data from other devices. Responding module 309, proxy module 311, and access control module 313 are modules that may be used to control how the white space data is provided to a requesting device (e.g., requesting device 110, FIGS. 1-2). Modules 309, 311 and 313 may be implemented in any suitable combination of hardware and software.

In some embodiments, responding module 309 responds to requests for a copy of the white space data 315. Responding module 309 may monitor communications received through a network interface 305A or 305B for a communication indicating a request from a requesting device. Though, any suitable approach may be used to trigger operation of responding module 309. For example, responding module may use known programming techniques to register with a network interface or other suitable component to receive a notification when a communication with a header or other field containing a value identifying the communication as a request.

Proxy module 311 may establish and control a proxy connection between a database server and the requesting device. Proxy module 311 may operate in any suitable way. For example, receiving device 320 may receive messages over a wireless network interface 305A or 305B that are commands from a requesting device to obtain white space data. Proxy module 311 may monitor for these commands, be notified of these commands or be triggered in any other suitable way to respond to such commands. Regardless, in responding to such a command, proxy module 311 may send a request to an authoritative source of white space data, such as server 140 (FIG. 1). Proxy module 311 may then forward all or a portion of the response from the source to the requesting module.

As an alternative, proxy module 311 may act as a conduit for communication between a requesting device and source of white space data. In this embodiment, rather than treating messages from a requesting device as commands, any message from a receiving device may be forwarded, without processing, to the server. In such an embodiment, proxy module 311 may include a component at a relatively low level of a network stack within receiving device 320. In this scenario, proxy module 311 may receive input identifying a location of an authoritative source of white space data. Proxy module 311 would then forward any received message, including an indicator that it is a request for white space data, to the authoritative source.

Modules 309 and 311 may be configured to implement method 500 and sub-method 550 which are subsequently discussed with reference to FIGS. 5A-B.

In some embodiments, a user of a wireless device may configure the device so that, upon receiving a wireless communication formatted as a request for white space data, the receiving device responds to the request if it has white space data to share or has a network connection through which it can act as a proxy. Programming a wireless device to operate in this fashion may promote other users to similarly configure their devices to respond to requests, which may increase the likelihood that a device will be able to obtain white space data as a result of the cooperative action of multiple wireless devices operating in a region.

However, performance of a receiving device may suffer if it receives too many requests for white space data. Such a situation may occur unintentionally, if a receiving device is located in an environment with many other wireless devices, or may occur as the result of malicious actions of a party operating a wireless device in the environment. Accordingly, receiving device 320 may include a mechanism to limit the amount of resources devoted to responding to requests for white space data. In this example, receiving device 320 includes access control module 313.

Access control module 313 may limit the amount of time responding module 309 uses responding to requests for the white space database. For example, access control module 313 may limit responding module 309 to consuming less than 1, 3, 5 or 10 percent of its processing power, network bandwidth or other resource used in responding to requests for white space data. Though, other techniques for limiting resource usage may be employed. As another example, access control module 313 may limit how long a proxy connection will be maintained (e.g., 0.5 sec.). As another example, access control module 313 may force the requesting device to wait a certain amount of time, potentially determined randomly, before the requesting device may use receiving the device's resources or the receiving device may set a time after responding to a request for white space data until it will respond to another request for white space data.

In some embodiments, the nature of the limitations and the value of limitations on amount of resources a receiving device devotes to collaborating with other devices requesting white space data may be determined by a policy. The policy may be derived in any suitable way. For example, a default policy may be included in an operating system of the device. Alternatively, the policy may be set or modified by user input or other suitable form of input.

Access control module 313 may operate in any suitable way. For example, it may issue a command that suppresses and later enables operation of responding module 309 and/or proxy module 311. Though, as yet another example, in response to a request to act as a proxy to form a connection with a server that can provide white space data, access control module 313 may delegate the connection to another receiving device. Though, it should be appreciated that access control module 313 may limit access to responding device 320 in any suitable way.

It should be appreciated that while receiving device 110 and requesting device 320 have been described separately, in some embodiments, a single device may be configured to operate as either requesting device 110 or receiving device 320 depending on the circumstances. For example, once a device has obtained a copy of the white space data, the device may then respond to a request from another device by providing the white space data. As another example, a device receiving a copy of the white space data from the database server may advertise to other devices in the environment that an up-to-date copy of the white space data is available.

Having described requesting device 110 and an exemplary receiving device 320, methods of operating the devices are described with reference to FIG. 4A-B and FIG. 5A-B, respectively.

Figure 4A:
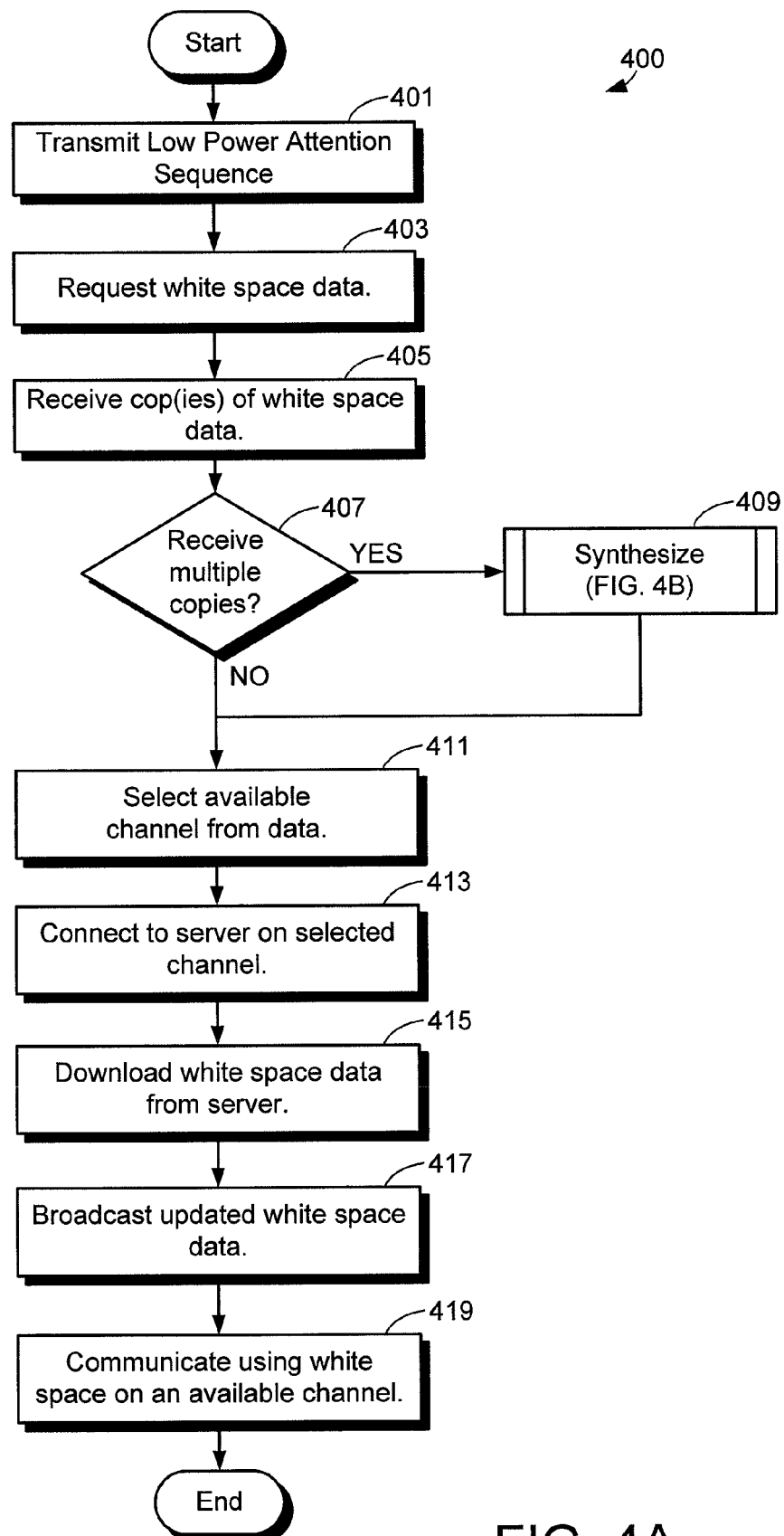
FIG. 4A is a flow chart of a method for configuring a portable wireless device to communicate in a white space according to some embodiments of the invention.

FIG. 4A is a flow chart of a method 400 of connecting a wireless device to a white space service. Method 400 may be performed, for example, by operation of requesting device 110 shown in FIG. 2. Though, method 400 may be implemented in any suitable way.

Any suitable protocol may be used to transmit a request. The protocol may involve initially transmitting, at step 401 a low power attention sequence. The attention sequence may have a duration such that a receiving device that is only periodically monitoring for requests may detect that a requesting device is preparing to transmit a request such that the receiving device may monitor for the request.

Though, it should be appreciated that any other suitable protocol may be used. In some embodiments, the request may be encoded as an information element in an 802.11 beacon signal or other control communication according to 802.11 or any other suitable standard. Devices that operate according to a standard may be configured to detect beacons or control communications sent according to that standard. In such a scenario, a receiving device may detect a wireless transmission containing a request, without an attention sequence such as is illustrated by step 401.

Regardless of the protocol used, at step 403, the requesting device may wirelessly transmit into the operating environment a request for white space data. The request may be encoded in any suitable way that allows a receiving device to recognize it as a request. In some embodiments, the request may contain other information used in obtaining white space data through interaction with other devices. For example, the request may identify the geographic region of the requesting device. As an example of another option, the request may indicate whether the device wishes to connect to a database server through a proxy device or to receive a copy of the database directly from a locally stored repository of a device receiving the transmitted request (receiving device). If multiple sources of the white space data are acceptable, a preference may be specified by the request. In some embodiments, security requirements are indicated. The security requirements may, for example, indicate how the requesting device will authenticate a received copy of the white space data.

In some embodiments, the request is transmitted on an unlicensed, public channel. For example, a Wi-Fi control message, such as a probe request or an IEEE 802.11 beacon signal, with an information element (IE) specifying the request, may be sent. IEEE 802.11 operates at unlicensed frequencies such as in the 2.4, 3.6 and 5 GHz bands. In some embodiments, the request is transmitted in a band between 1.8 GHz and 3 GHz. The transmitted request may be repeated periodically while waiting to receive a response to the request. In some embodiments, the request is transmitted on several different unlicensed channels.

At step 405, one or more copies of the white space data are received at the requesting device. For example, one or more receiving devices may respond to the request by providing a copy of the white space data. In some embodiments, the white space data is received by the requesting device from a white space database server with the device directly receiving the request acting as a proxy. The white space data may be received over an open or a secure wireless channel between the devices. In some embodiments the received copies of the white space data are authenticated. For example, a secure channel may be established for receiving the copy of the data using keys associated with a trusted source. Though, any suitable form of authentication may be used.

Each received copy of the white space data may indicate a version of the database and a geographic region in which the data may be used. The data may also indicate which frequency bands are being used in the geographic region. In some embodiments, the data may provide a listing of the licensed channels being used. In yet some other embodiments, the white space data may indicate which licensed channels are available as white space. For example, if TV "channel 2" is not being used, the white space data may indicate that that 54 to 60 MHz is an available white space channel. White space channels may be available in sub-bands of the licensed television spectrum which extends from about 50 to 810 MHz. An available channel may be identified in any suitable way, such as by channel number or frequency range. Moreover, the "channel" designated for use as white space need not correspond to a channel that could be assigned to a licensed user. The white space channel could correspond to any suitable range of frequencies, which could have a bandwidth greater or less than that of licensed user. Moreover, the identification of a white space channel may include information other than a range of frequencies. For example, the white space data may indicate that a licensed channel is only being used at select times.

Regardless of the format of the white space data, at step 407, a determination is made whether multiple copies of the white space data have been received that need to be synthesized. If not, method 400 continues to step 411. If multiple copies to have been received, method 400 continues to step 409.

At step 409 the copies are synthesized to identify available channels in the white space spectrum. In some embodiments, sub-method 450 of synthesizing copies of the white space data is performed. Though, it should be appreciated that receipt of multiple databases may be resolved in any suitable way. Sub-method 450 is subsequently discussed with reference to FIG. 4B. After performing a suitable synthesis of the white space data at step 409, method 400 continues to step 411.

At step 411, transmission and reception parameters are selected based on the white space data. For example, the parameters may enable the device to communicate using the white space without interfering with licensed broadcasts. In some embodiments, the transmission and reception parameters are selected by selecting a white space channel. The channel may be chosen from among the channels indicated as available by the copy or synthesized copy of the white space data. The channel or channels may be chosen in any suitable way.

In some embodiments, the requesting device makes a selection from among all channels indicated in the white space data to be available based on a quality metric. For example, the requesting device may attempt to connect to a server using different channels until a connection is established on one of the channels. In some embodiments, the device may select a channel having preferred operating characteristics. For example, the device may choose a channel having preferred propagating characteristics or a channel that is furthest in frequency from licensed channels currently in use. In some embodiments, a channel is selected by input from the user.

Once a channel is selected, white space communication may be performed over the channel. Though, in some embodiments, the selected channel may act as an interim channel used to verify that the white space data received from other devices is accurate. Accordingly, at step 413, the selected white space channel may be used to connect to a trusted source of white space data.

In the example illustrated, the interim channel is used to connect to a white space database server. For example, the device may connect to the database server through a white space service that provides a connection to the Internet. Though, connection to the white space database server may be formed directly or through a network other than the Internet.

At step 415, up-to-date white space data may be downloaded from the white space database server. After downloading an up-to-date copy from the database server, any copies obtained by bootstrapping the device may be discarded. The up-to-date copy may be used for further identification of available white space channels.

At step 417, the device may broadcast the up-to-date white space data to other devices in the environment or otherwise indicate the availability of the up-to-date data. The up-to-date white space data may be broadcast in ways similar to which data copies were received at step 405. For example, the data may be broadcast over unlicensed spectrum. Though, the broadcast may be sent in any suitable way. In this way, devices in the environment may update their locally stored copies of the white space data with the broadcast up-to-date version.

At step 419, an available white space channel is selected using the up-to-date copy of the white space data obtained at step 415 from the white space database server. This selected channel may thereafter be used for white space communication, including for communication with a white space service.

Figure 4B:
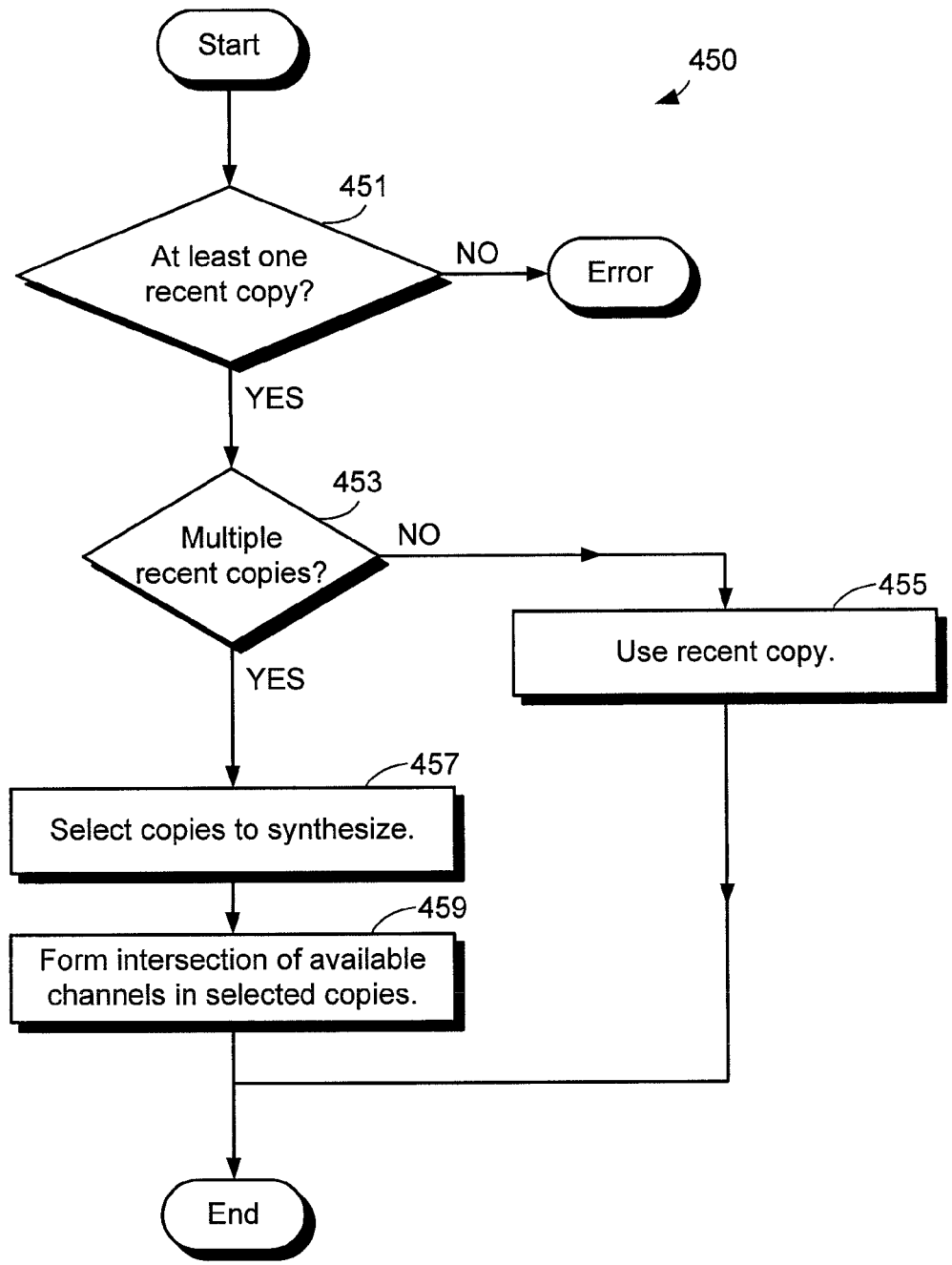
FIG. 4B is a flow chart of a method of synthesizing white space data obtained from multiple sources according to some embodiments of the invention.

Having discussed method 400, sub-method 450 for synthesizing multiple copies of white space data is now discussed with reference to FIG. 4B.

At step 451, a determination is made whether one of the received copies is a "recent" copy of the white space data. A copy of the data may be deemed "recent" if it was obtained from an authoritative source within some threshold time preceding the time at which the data is to be used to select a channel. When each copy of the database was obtained may be determined, for example, from time information included with the copy. If the threshold time was one day (24 hours), only those copies of the database obtained from a database server in the last 24 hours would be considered new. Though, the threshold time may be any suitable value such as a day, 2 days, or a week.

If it is determined at step 451 that there is not a recent copy of the white space data, sub-method 450 may indicate an error, ending the method. Though, any suitable action may be taken if no received copies are recent. In some embodiments, method 400 may return to step 403 and rebroadcast a request for the white space data. As another alternative, a requesting device may initiate actions to obtain white space data in other ways, such as by identifying a nearby device that has an active network connection and can act as a proxy for a connection to an authoritative source of white space data.

If, however, it is determined at step 451 that there is at least one recent copy of the white space data, sub-method 450 proceeds to step 453 where it is determined whether multiple recent copies of the white space data are available. If not, a determination is made at step 455 to use the one recent copy of the white space data and sub-method 450 ends. Method 400 may continue at step 411 using the identified recent copy of the white space data.

If it is determined at step 453 that there are multiple recent copies, sub-method 450 continues to step 457 at which some or all of the received copies are selected for synthesis. In some embodiments, all of the recent copies are selected. In another embodiment, only a subset of the recent copies are selected. For example, another threshold time may be used to determine which copies of the white space data should be selected based on distance from the requesting device or time since the data was obtained from an authoritative source. Though, the copies to synthesize may be selected in any suitable way.

At step 459, the selected copies are synthesized to identify the available white space channels. In some embodiments, the available channels are identified as the intersection of available channels among all the selected copies. That is, only channels indicated as available by all the selected copies of the white space data are identified as available in the synthesized data. Equivalently, any channel identified by any of the selected copies as unavailable may be deemed unavailable when forming the synthesized data, even if one or more of the other copies indicate the channel is available. It should be appreciated that any copies of the white space data that were not selected at step 457 are ignored. Of course, if only one copy of the data is selected at step 457, that copy is used to identify the available channels. After step 459, sub-method 450 ends and method 400 may continue at step 411. While sub-method 450 has discussed some ways of resolving multiple copies of the white space data, as noted above, any suitable method may be used. For example, in some embodiments, the most up-to-date version of the white space data may be used and all others ignored. As another example, if a copy of the white space data has been received from the database server using a receiving device as a proxy, all other copies may be ignored. As yet another example, the method may identify available channels from the first copy of the database received and ignore all subsequent copies.

In some embodiments, obtaining module 209 of requesting device 110 (FIG. 2) may be configured to perform steps 401 through 407 of method 400. Combining module 211 (FIG. 2) may be configured to perform step 409 (method 450). Connecting module 213 (FIG. 2) may be configured to perform step 411 through 419. Though, modules 209-213 of requesting device 110 (FIG. 2) may be configured in any suitable way.

It should be appreciated that in some embodiments of method 400 some steps may be optionally performed and steps may be performed in sequences other than the order shown.

Figure 5A:
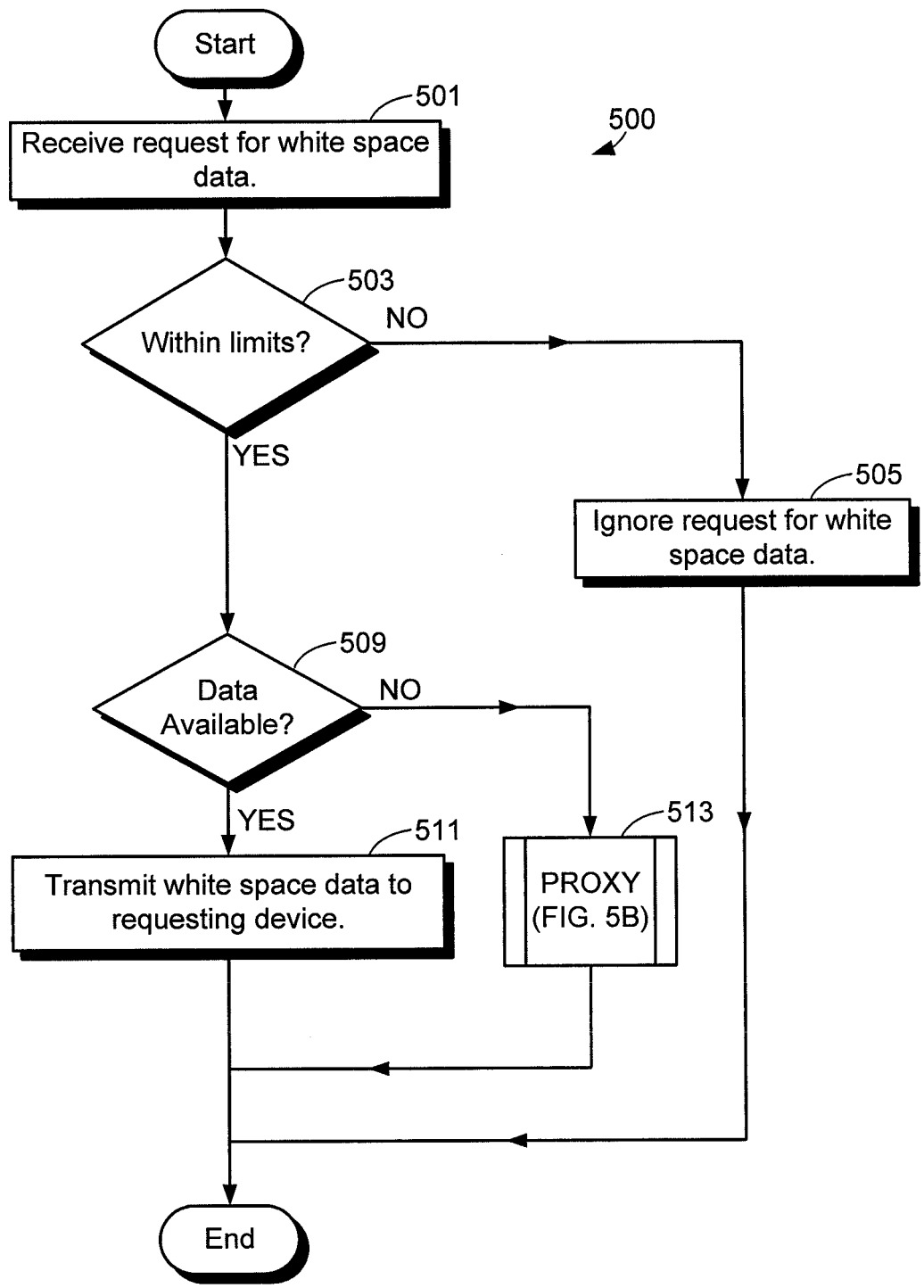
FIG. 5A is a flow chart of a method of operating a device to respond to a request for white space data according to some embodiments.

Turning now to FIG. 5A, a method 500 of responding to a request for a white space database is discussed. Method 500 may be performed, for example, by operation of any of the receiving devices 120A . . . 120E shown in FIG. 1, such as receiving device 320 shown in FIG. 3. Though, method 500 may be implemented in any suitable way.

At step 501, a receiving device may receive a wireless transmission representing a request for white space data. The receiving device may monitor a channel for such a request, detect the request within a communication that the receiving device may otherwise be monitoring or detect the request in any suitable way. Though, it should be appreciated that in embodiments in which the request is packaged within a message that the receiving device may otherwise receive, receiving the request at step 501 may occur as part of processing those messages.

Regardless of how the request is detected, at step 503, the receiving device determines whether it is within limits imposed for processing requests for white space data. For example, an operator of the receiving device may configure the device to limit the amount of resources devoted to responding to requests. The limits may be specified as an amount of time, a portion of processor or bandwidth use, or any other resource that may be consumed by responding to white space data requests.

If these limits are exceeded, method 500 may ignore any requests for white space data, as indicated by step 505. It should be appreciated that step 505 may not entail express actions and could alternatively involve ending processing of a request. Also, step 505 need not be performed in exactly the order indicated. Requests could be ignored, for example, by turning off a receiver in a NIC or other action that precludes reception of a request.

If however, the receiving device is within whatever limits are applicable, a determination is made at step 509 where the white space data is locally available, for example, from a computer-storage medium of the device. This determination may entail simply determining whether receiving device stores any copy of white space data. Though, processing at step 509 may entail other checks, such as checking whether the white space data stored on the receiving device is recent or corresponds to a geographic location identified in the request. If it is determined that the white space data is available, at step 511 the locally available white space data is transmitted to the requesting device. In some embodiments, security measures are taken to demonstrate the authenticity of the provided copy.

If it is determined that the white space data is not available at step 509, other steps may be taken by the receiving device to participate in a collaborative process with the requesting device that enables the requesting device to obtain a copy of white space data. In the embodiment illustrated, the method continues to step 513 where the receiving devices may be configured to act as a proxy through which the white space data may be downloaded from a white space database server.

Figure 5B:
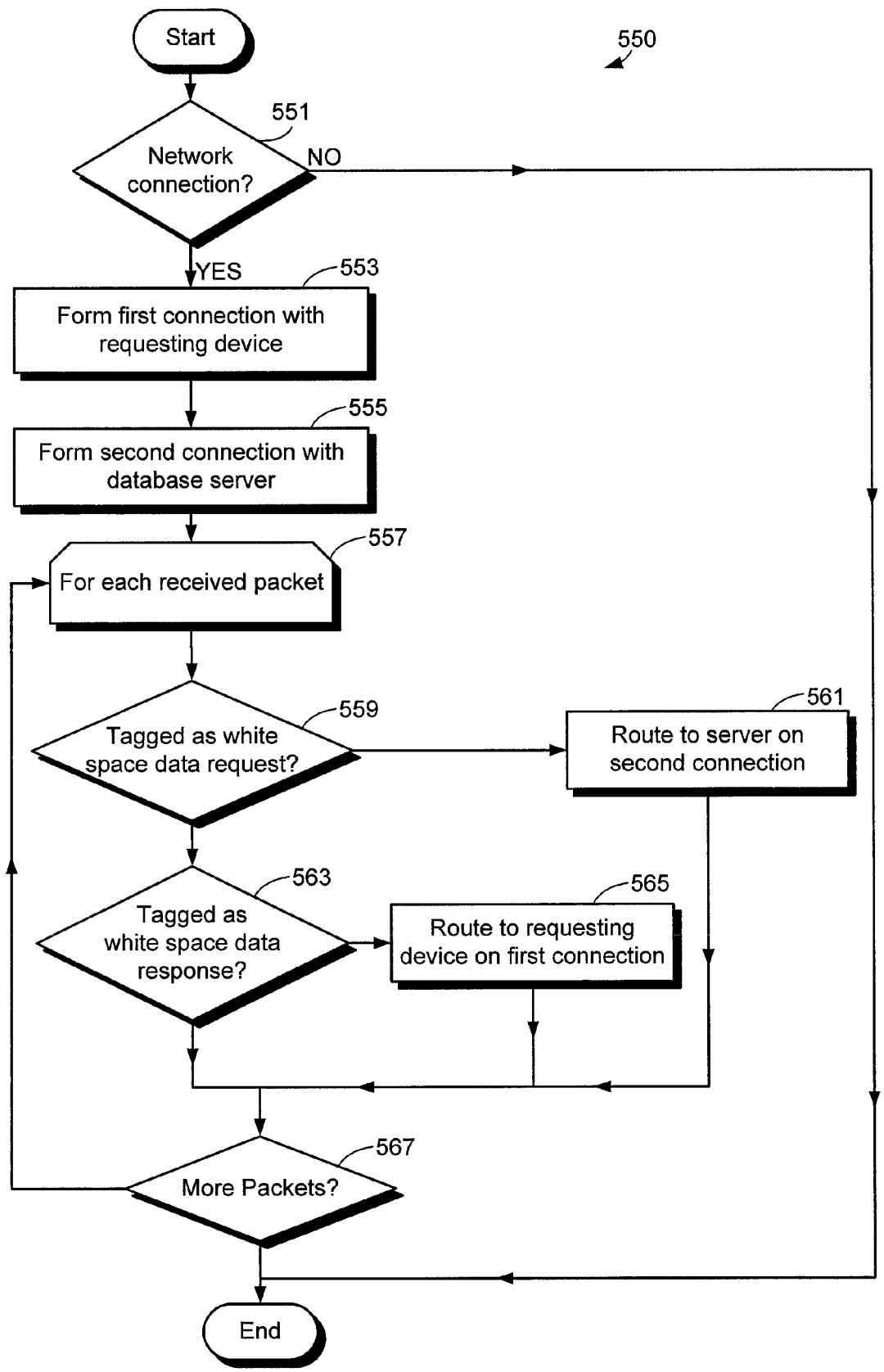
FIG. 5B is a flow chart of a method of operating a device to act as a proxy for a request for white space data according to some embodiments of the invention.

As discussed above, in some embodiments operation of the receiving device as a proxy at step 509 may be performed in accordance with sub-method 550, shown in FIG. 5B.

At step 551 of sub-method 550, a determination is made as to whether a network connection exists over which the receiving device may access a database server. If no such network connection exists, sub-method 550 ends.

If it is determined at step 551 that a network connection to a database server exists, sub-method 550 continues to step 553.

At step 553, a first connection is formed between the receiving device and the requesting device. At step 555, a second connection is formed between the receiving device an the database server. The first and second connection may collectively define a connection that may have end-to-end security from the requesting device to the database server ensuring the provided copy of the white space data is authentic.

According to sub-method 550 the receiving device is operated as a proxy between the requesting device and the database server by suitably routing received packets according to steps 557-567. In this example, routing messages includes forwarding the messages without modification such that end-to-end security can be used.

For each packet received (step 557) a determination is made whether the packet is tagged as a white space request (step 559). If so, at step 561 the tagged white space request packet is routed using the second connection to the database server.

It the packet is not tagged as a white space request, it is further determined at step 563 if the packet is tagged as a white space data response. If so, at step 565 the white space data response packet is routed using the first connection to the requesting device.

In this way, the requesting device may transfer a request to the database server through the receiving device and the database server may provide an up-to-date copy of the white space database to the requesting device through the receiving device. Of course, packets that are not tagged as a white space request or white space response may be suitably processed.

After appropriate treatment of the packet, it is determined whether another packet related to the operation of the receiving device as proxy has been or is expected to be received. If so, sub-method 550 returns to step 557 to begin processing a next received packet. If no further packets related to operation of the receiving device as proxy remain, sub-method 550 may end. Optionally, the first and/or second connection may be terminated and resources related to these connections may be freed.

Sub-method 550 illustrates some embodiments in which a receiving device operates as a proxy between the requesting device and the database server. It should be appreciated that a receiving device may be configured to act as a proxy in any suitable way. For example, in some embodiments the receiving device also retains a copy of the white space data received from the database server. In some embodiments, only changes with respect to a locally stored copy of the white space data are downloaded from the proxy server. The changes may be applied to the local copy which is then forwarded to the requesting device. As another example, the receiving device may determine if the local copy of the white space data is out dated, and if so, form the proxy connection such that a new version of the database may be provided to both the requesting device and the receiving device.

In some embodiments, responding module 309, proxy module 311 and access control module 313 of receiving device 320 (FIG. 3) may be configured to perform some or all of steps method 500 and sub-method 550. Though, modules 309-313 may be configured in any suitable way.

Figure 6:
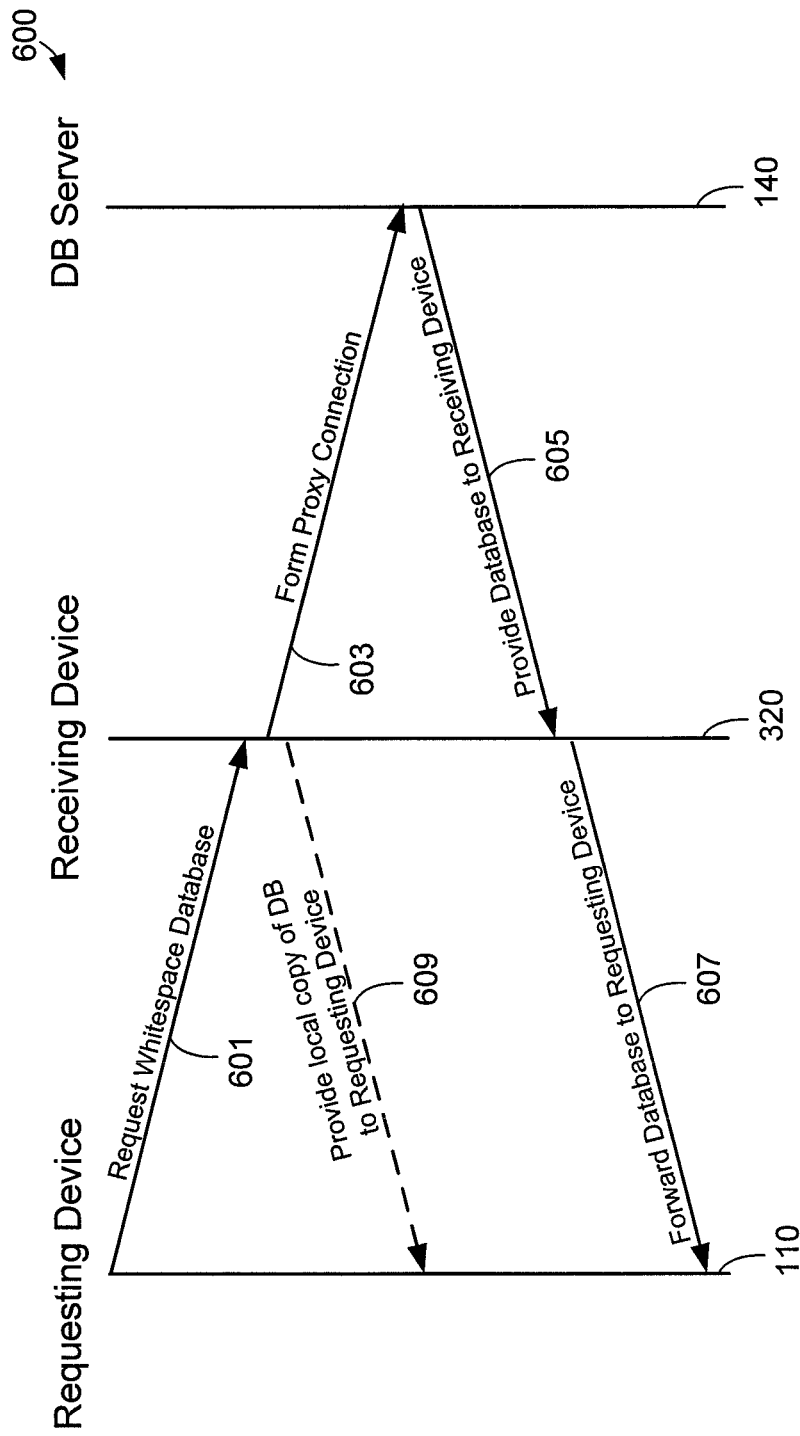
FIG. 6 is a signal diagram of a method of providing a white space data to a requesting device from a database server, acting as trusted source, with a receiving device acting as an intermediate proxy.

FIG. 6 is a signaling diagram 600 illustrating exchange of messages between requesting device 110, receiving device 320 and database server 140 according to some embodiments. Reference is made to methods 400 and 500 for details of the signaling and processing performed by requesting device 110 and receiving device 120, respectfully.

Signal 601 is sent from requesting device 110 to receiving device 320. Signal 601 contains a request that a copy of the white space database be provided to requesting device 110 (step 403, FIG. 4A, step 501, FIG. 5A).

Once signal 601 is received by receiving device 320 a decision is made whether to provide a local copy of the white space database or to provide a copy through a connection to database server 140 (step 509, FIG. 5A). In the former case, receiving device 320 transmits signal 609 to requesting device 110. Signal 609 includes a copy of the white space database locally stored by receiving device 320 (step 511, FIG. 5A).

If the database is to be provided from the database server 140, with receiving device 320 acting as a proxy, signal 603 is sent to server 140 to establish the proxy connection (steps 553-555, FIG. 5B). After establishing the proxy connection, server 140 sends signal 605 to receiving device 320. Signal 605 includes an up-to-date copy of the white space database.

In some embodiments, signal 605 may simply include changes with respect to a version of the database stored locally by receiving device 320. Receiving device 320 then sends signal 607 to requesting device 110 forwarding the up-to-date database (step 557-567, FIG. 5B).

It should be appreciated that signaling diagram 600 may omit some signaling that may occur. Additional signaling may, for example, be used to establish connectivity between the devices, provide authenticating information, and to acknowledge receipt of received information.

Having thus described several aspects of at least one embodiment of this invention, it is to be appreciated that various alterations, modifications, and improvements will readily occur to those skilled in the art.

For example, a request for white space data may contain different or additional information than described above. In some embodiments, the request may specify the location of requesting device 110. The location may be used by the receiving device to identify a local repository of white space data to which it should connect or to identify white space data applicable to a particular location that responds to the request.

Also, multiple ways that a receiving device may participate in obtaining white space data for a requesting device were described. For example, it was described that a receiving device may either provide a copy of data from a local store or acting as a proxy to allow the requesting device to connect to a source of the data. These techniques may be used singly or together. Alternatively or additionally, other techniques may be used. For example, if a receiving device does not have a copy of the white space data, it may in turn issue a request to other devices that may be nearby.

As another example, database server 140 is only shown with one white space database 141, which may be a geographically limited database containing channel assignments in the licensed spectrum in environment 100 (FIG. 1). However, it should be appreciated that the database server may store white space data for geographic regions other than that in which requesting device 110 resides. In such a scenario, location information in a request may indicate which copy is provided.

As another example, the modules performing the methods for sharing white space data may be implemented as part of the operating systems of the receiving device and the request device. Though, the modules illustrated in FIGS. 2 and 3 may be in any suitable portion of the devices.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a portable wireless device in communication with at least one other portable wireless device, the method performed by the portable wireless device and comprising:
    wirelessly sending a request for a spectrum database;
    wirelessly receiving a communication from the at least one other portable wireless devices, the communication comprising at least one copy of the spectrum database, the spectrum database comprising information indicating a plurality of white space frequency bands or white space channels in a publicly licensed spectrum, wherein the white space frequency bands or white space channels have not been assigned to any entity by a corresponding regulatory entity;
    selecting, by the portable wireless device, from among the white space frequency bands or white space channels in the spectrum database, a target white space band or white space channel;
    selecting transmission and receiving parameters corresponding to the target white space band or white space channel; and
    configuring the device to use the selected parameters to communicate using the publicly unassigned target white space band or white space channel.

2. The method of claim 1, wherein:
    the at least one copy of the spectrum database being stored with comprises a plurality of other copies of spectrum database, each copy of spectrum database comprising a respective time value associated therewith,
    combining the received spectrum data and the stored spectrum database into composite spectrum database based on the time values; and
    selecting the target white space band or white space channel from among the composite spectrum database.

3. The method of claim 2, wherein:
each of the time values comprises a version identifier; and
the selecting the target white space band or white space channel from among the composite spectrum data is based on the version identifiers.

4. The method of claim 2, wherein:
each copy of the spectrum database indicates white space bands or white space channels; and
selecting the target white space band or white space channel comprises combining the copies of spectrum database by finding an intersection of the white space bands or channels identified by the copies of the spectrum database.

5. The method of claim 1, wherein wirelessly sending a request comprises transmitting an IEEE 802.11 beacon signal comprising an Information Element indicating the request.

6. The method of claim 1, wherein the other portable wireless device functions as a proxy device, the method further comprising:
establishing a secure connection through the proxy device to a trusted source of the spectrum data; and
receiving the communication through the proxy device from the trusted source.

7. The method of claim 6, further comprising:
receiving a request from a requesting wireless device; and
responding to the request from the requesting wireless device by transmitting the spectrum data.

8. A portable wireless device comprising:
a wireless network interface that sends and receives information wirelessly;
a responding module that detects receipt of a request for white space data received from a requesting device through the wireless network interface and, when the request is detected:
  determines whether transmitting white space data in response to the request is consistent with a policy relating to allocation of resources of the portable wireless device for transmitting white space data, the white space data comprising information indicating portions of a licensed wireless spectrum that have not been assigned to any entity by an agency that licenses frequency bandwidths within the licensed wireless spectrum;
  when it is determined that transmitting the white space data is consistent with the policy, controls the wireless network interface to wirelessly communicate a copy of the white space data to the requesting device, the white space data identifying available channels in a licensed spectrum; and
a selecting module that uses the white space data to select one of the available channels for the wireless network interface.

9. The portable wireless device of claim 8, wherein:
the wireless device further comprises a computer-storage medium for locally storing the copy of the white space data; and
wirelessly communicating a copy of the white space data to the requesting device comprises transmitting a locally stored copy of the white space data to the requesting device.

10. The portable wireless device of claim 9, wherein the request comprises a low power attention sequence.

11. The portable wireless device of claim 8, wherein:
the responding module is further adapted to act as a proxy whereby the request from the requesting device is conveyed over a network to a server; and
the wirelessly communicated copy of the white space data comprises communications received from the server that are relayed to the requesting device.

12. The portable wireless device of claim 8, wherein: the licensed spectrum comprises channels centered on frequencies below 1 GHz; and the wireless network interface is adapted for communicating over channels centered on frequencies centered on frequencies in excess of 2 GHz.

13. The portable wireless device of claim 8, further comprising a processor, wherein the responding module comprises code executable by said processor.

14. The portable wireless device of claim 8, wherein the responding module controls the wireless network interface to monitor unlicensed channels of spectrum for receipt of the request.

15. A computer-storage device comprising computer-executable instructions that, when executed, perform a method of operating a portable wireless device to communicate in a white space of the communication spectrum, the method comprising:
broadcasting a request for a white space database;
wirelessly receiving at least one first copy of the white space database from at least one other portable wireless device, the first white space database comprising information identifying unassigned portions of a licensed wireless spectrum, the unassigned portions comprising portions that have not been assigned to any entity by an agency that licenses frequency bandwidths within the licensed wireless spectrum;
selecting a first channel from the at least one first copy of the white space database based on the at least one first copy indicating that the first channel is unassigned;
communicating with a trusted source over the first channel, the communicating comprising obtaining a second copy of the whitespace database;
selecting a second channel from the second copy of the white space database based on the at least one second copy indicating that the second channel is unassigned; and
configuring the device for communication on the second channel.

16. The computer-storage device claim 15, wherein:
broadcasting the request comprises transmitting a wireless signal in a frequency range between 1.8 GHz and 3 GHz; and
configuring the device for communication on the second channel comprises forming a wireless connection on a channel centered at a frequency centered between 50 MHz and 810 MHz.

17. The computer-storage device of claim 15, wherein:
broadcasting the request comprises transmitting a low-power attention sequence.

18. The computer-storage device of claim 15, wherein:
the at least one first copy of the white space database comprises a plurality of copies of the white space database, each of the plurality of copies indicating a version of the white space database, and
selecting a first channel comprises combining the plurality of copies into a composite database based on the version of each copy.

19. The computer-storage device of claim 15, wherein the method further comprises broadcasting updates to the whitespace database based on the second copy.

* * * * *